US009540857B2

(12) United States Patent
Simon et al.

(10) Patent No.: US 9,540,857 B2
(45) Date of Patent: Jan. 10, 2017

(54) MECHANISM WITH SIMPLIFIED HANDLING FOR CONTROLLING A DEVICE FOR SEALINGLY CONNECTING TWO ENCLOSED SPACES

(71) Applicant: Getinge la Calhene, Vendome (FR)

(72) Inventors: Jean-Pierre Simon, Vendome (FR); Bernard Chavrot, Athee sur Cher (FR); Christophe Dufour, Saint Amand Longpre (FR)

(73) Assignee: GETINGE LA CALHENE, Vendome (FR)

( * ) Notice: Subject to any disclaimer, the term of this patent is extended or adjusted under 35 U.S.C. 154(b) by 331 days.

(21) Appl. No.: 14/347,702

(22) PCT Filed: Sep. 28, 2012

(86) PCT No.: PCT/EP2012/069271
§ 371 (c)(1),
(2) Date: Mar. 27, 2014

(87) PCT Pub. No.: WO2013/045667
PCT Pub. Date: Apr. 4, 2013

(65) Prior Publication Data
US 2014/0230963 A1    Aug. 21, 2014

(30) Foreign Application Priority Data
Sep. 30, 2011    (FR) .................................... 11 58838

(51) Int. Cl.
*B65B 1/04* (2006.01)
*E05F 15/20* (2006.01)
(Continued)

(52) U.S. Cl.
CPC ............... *E05F 15/20* (2013.01); *B65G 65/40* (2013.01); *B65G 69/183* (2013.01);
(Continued)

(58) Field of Classification Search
CPC ............................... B65G 69/183; G21F 7/005
See application file for complete search history.

(56) References Cited

U.S. PATENT DOCUMENTS

| 3,682,208 A | 8/1972 | Fedi |
| 4,643,328 A | 2/1987 | Lorenzelli |
(Continued)

FOREIGN PATENT DOCUMENTS

| DE | 10 2006 013157 A1 | 4/2007 |
| EP | 0 662 373 A1 | 7/1995 |
(Continued)

OTHER PUBLICATIONS

Search Report issued in French Patent Application No. FR 11 58838 dated May 21, 2012.
(Continued)

*Primary Examiner* — Jason K Niesz
(74) *Attorney, Agent, or Firm* — Pearne & Gordon LLP

(57) ABSTRACT

Mechanism for controlling a device for sealingly connecting an enclosure and a container, with the enclosure comprising a door (10) and the container comprising a door (14), with the door (10) of the enclosure containing the control mechanism (D), with that comprising a male element (34) cooperating with a recess of the door (14) of the container, with this male element (34) being rotatably movable about and translatably movable along a longitudinal axis (X) and is capable of being accommodated in the recess of the door (14), of locking the two doors (10, 14) together and of unlocking the door (14) of the container.

19 Claims, 11 Drawing Sheets

(51) Int. Cl.
  *B65G 69/18* (2006.01)
  *F16L 37/30* (2006.01)
  *G21F 7/005* (2006.01)
  *B65G 65/40* (2006.01)
  *E05F 15/603* (2015.01)
  *E05F 15/70* (2015.01)

(52) U.S. Cl.
  CPC ............ *E05F 15/603* (2015.01); *E05F 15/70* (2015.01); *F16L 37/30* (2013.01); *G21F 7/005* (2013.01)

(56) References Cited

U.S. PATENT DOCUMENTS

| | | |
|---|---|---|
| 5,421,626 A | 6/1995 | Glachet |
| 5,588,473 A | 12/1996 | Glachet |
| 5,884,660 A | 3/1999 | Cathrein |
| 2005/0217102 A1* | 10/2005 | Glachet ............... B01L 1/02 29/454 |
| 2014/0291995 A1 | 10/2014 | Chavrot |

FOREIGN PATENT DOCUMENTS

| | | |
|---|---|---|
| FR | 1 346 486 A | 12/1963 |
| FR | 2 040 616 | 1/1971 |
| FR | 2 695 343 A1 | 3/1994 |
| FR | 2 720 372 A1 | 12/1995 |
| GB | 1 018 655 | 1/1966 |
| JP | S62-24996 A | 2/1987 |
| JP | H06-193323 A | 7/1994 |
| WO | 03/057431 A1 | 7/2003 |

OTHER PUBLICATIONS

Written Opinion issued in French Patent Application No. FR 11 58838 dated May 21, 2012.
U.S. Appl. No. 14/384,787, filed Sep. 12, 2014.
International Search Report issued in Application No. PCT/EP2012/069271 dated Mar. 18, 2013.
International Preliminary Report on Patentability for PCT/EP2012/069271 dated Apr. 25, 2014.
Notification of Reason for Refusal issued in Japanese Patent Application No. 2014-532417 dated Oct. 4, 2016.

* cited by examiner

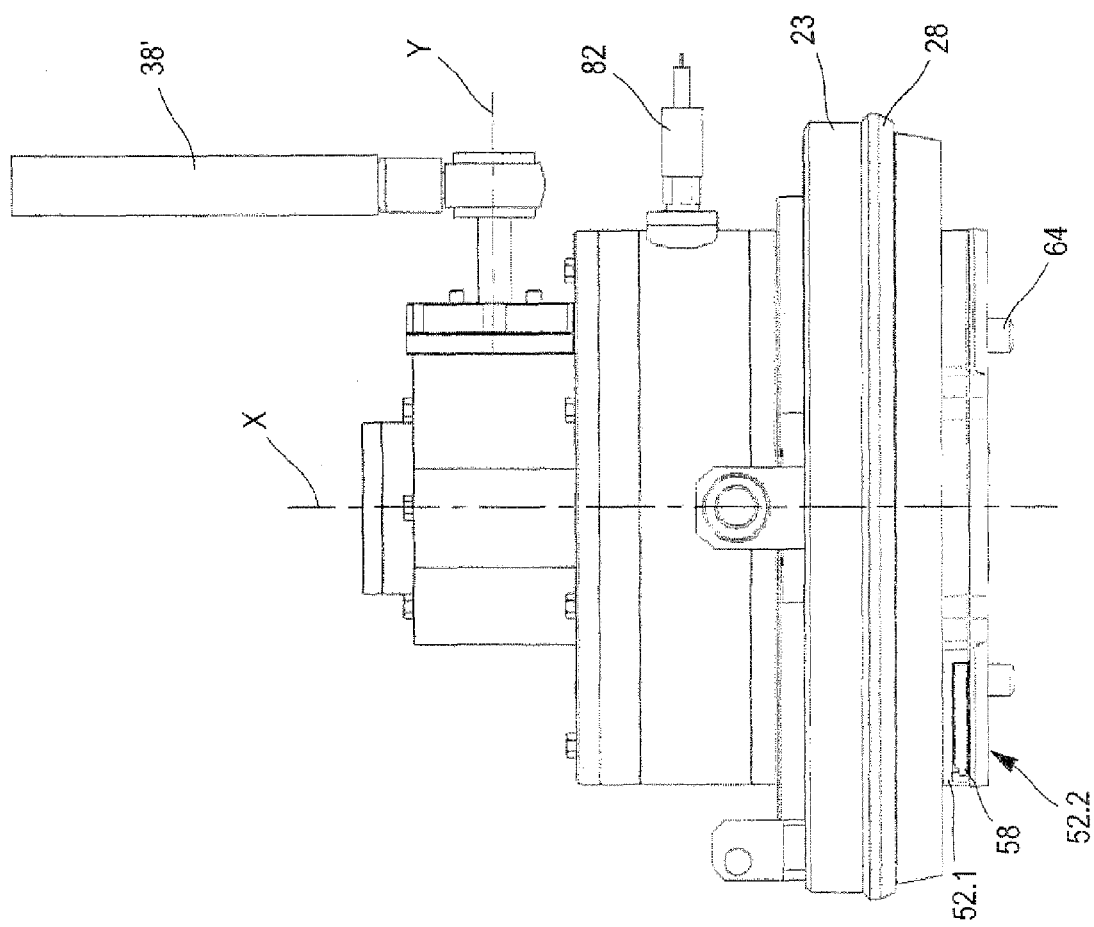

MECHANISM WITH SIMPLIFIED HANDLING FOR CONTROLLING A DEVICE FOR SEALINGLY CONNECTING TWO ENCLOSED SPACES

TECHNICAL FIELD AND PRIOR ART

This invention relates to a mechanism with simplified handling for controlling a device for sealingly connecting two enclosed spaces, and to a device for sealingly connecting two enclosed spaces comprising at least one such mechanism.

In a certain number of industrial sectors, among which shall be mentioned the nuclear, medical, pharmaceutical and agro-foods sectors, it is necessary or desirable to carry out certain tasks in a confined atmosphere, either in order to protect the personnel, for example from radioactivity, from toxicity, etc, or on the contrary to be able to carry out these tasks in an aseptic or dust-free atmosphere, or finally both simultaneously.

Transferring a device or a product from one enclosed space to another, without at any time the seal of each of these spaces with regards to the exterior being broken, poses a delicate problem to be solved. This problem can be resolved by a double-door connecting device.

Such a double-door device is for example known in FR2695343. Each space is enclosed by a door mounted in a flange. Each door is secured to its flange via a bayonet connection and the two flanges are intended to secured to each other via a bayonet connection.

In the case wherein one of the enclosed spaces is formed by a container and the other space by a glove box, the transfer is carried out in the following manner. The flange of the container comprises on its exterior periphery lugs intended to cooperate with a recess of the flange of the glove box. The flange of the container is introduced into the flange of the glove box, the container is oriented in such a way as to make the lugs correspond with the recess. A first rotation of the container along the axis of its door makes it possible to attach the flange of the container to the flange of the glove box via the bayonet connection. By means of a second rotation of the container, along the same axis and in continuity with the first rotation, the door of the container is pivoted in relation to the container, providing both an attaching via another bayonet connection with the door of the container and a detaching of the new unit formed by the two adjoining doors with regards to the flanges of the door and of the glove box. A control handle located in the glove box makes it possible to unlock a safety mechanism and to release the passage between the two spaces. In the case of an aseptic atmosphere, as the exterior surfaces of the two doors are in contact sealingly together, they cannot contaminate the interior of the spaces.

This device gives full satisfaction in the case of the transfer of solid products, with limited weights at stake. However it requires the rotation of the container in order to make the two flanges correspond and then to attach them. In the case of a container of large size, the handling of the device in rotation can become laborious. In the case wherein the device for connecting is vertical, it is not always easy to pivot the container. Moreover, if the product to be transferred is a powder, the presence of lugs for the connection can make cleaning more difficult.

DESCRIPTION OF THE INVENTION

It is consequently a purpose of this invention to offer a mechanism for controlling a device for sealingly connecting two enclosed spaces, for example a container and an enclosure allowing for an easier connection of the two spaces, without rotation of the two spaces.

It is also an additional purpose of this invention to offer a passage of simplified shape between the two spaces allowing for facilitated cleaning.

The aforementioned purpose is achieved by a mechanism for controlling a device for connecting arranged in one of the spaces, intended to dock the door of the other space and providing during its activation the connection of the two doors sealingly and then their unlocking with regards to flanges in order to form a sealed passage between the two spaces.

In other terms, the control mechanism only requires a putting into contact of the two flanges, the latter comprising a docking head arranged in one of the spaces, automatically docking the door of the other space regardless of its orientation, attaching itself to the latter and unlocking it.

The mechanism according to the invention has the advantage of not requiring any angular orientation of the two spaces in relation to one another, which simplifies the manoeuvre. Furthermore it allows for an automating of the manoeuvre since the movements of rotation are concentrated on one of the doors.

Several embodiments are possible according to the number of lugs chosen, which is at least two. In this case, according to the angular positioning of the docking head at the time of the putting into contact of the two spaces, a rotation that can range up to 180° is required in order to obtain the alignment of the lugs. If a higher number of lugs is chosen, the maximum angle of rotation is reduced proportionally. As such, for four lugs, the angle of rotation required in order to find the alignment of the lugs is only at most 90°. The friction is then reduced. The implementation of a higher number of lugs also has for advantage to provide better mechanical resistance and better distribution of the forces when the two doors are engaged.

Advantageously the docking mechanism is driven by an electric motor, allowing for automating the sealed putting into connection.

This subject-matter of the present invention is a mechanism for controlling a device for sealingly connecting a first and a second enclosed spaces, with the first space comprising a first flange delimiting a first opening and a first door closing off said first opening, with the second space comprising a second flange delimiting a second opening and a second door closing off said second opening, with the second door secured to the second flange via a bayonet connection, with the first door comprising an annular part providing the sealed contact with the first flange and with the second door and a casing, with the casing and the annular part delimiting with the second door a sealed space, said control mechanism mounted in the annular part, said control mechanism comprising a male element configured to cooperate with a female element carried by the second door via a bayonet connection, said control mechanism comprising means for driving in rotation said male element, said male element being translatably movable along the longitudinal axis and rotatably movable about the longitudinal axis in such a way as to allow for the connection between the two spaces according to at least the following phases:

a first phase of rotation for searching the docking position of the male element on the female element, a second phase of translation during which the male element docks with the female element, a third phase of rotation in order to provide the axial locking of the two doors, a fourth phase of rotation in order to provide the unlocking of the second door in relation to the second flange.

According to an additional characteristic, the male element comprises an axial locking portion and a control portion, said portions being rotatably movable in relation to one another about the longitudinal axis, with the axial locking portion configured for the axial locking of the first door and of the second door and the control portion configured for the locking or unlocking of the second cover.

For example, the axial locking portion can comprise a bracket perpendicular to the longitudinal axis and connected to the means for driving in rotation about the longitudinal axis, said bracket intended to cooperate with the recess of the second door in order to provide the axial locking of the first and second doors, and wherein the control portion comprises a first plate and a second plate substantially circular provided with lugs, said plates being parallel and spaced from one another along the longitudinal axis by a fixed distance in such a way as to arrange a space wherein is arranged able to pivot the bracket, said lugs intended to cooperate with cut-outs of the recess in such a way that a rotation of the control portion drives in rotation the second door, with the first plate and the second plate connected to the means for driving in rotation.

In an advantageous embodiment, the means for driving in rotation are engaged with a drive shaft attached to the bracket, with said first and second plates fixed on a hollow shaft with the drive shaft of the locking portion passing through, and wherein the control mechanism comprises means for attaching in retractable rotation connecting the bracket and the first and second plates in such a way that, during the first phase, the first and second plates and the bracket are secured in rotation, during the third phase, the bracket pivots and the first and second plates are immobile and, during the fourth phase, the first and second plates and the bracket are secured in rotation.

The drive shaft attached to the bracket is more preferably translatably movable along the longitudinal axis and wherein second elastic means are mounted in compression between the first plate and a fixed portion of the control mechanism is such a way as to push back the first plate and the bracket in the direction of the second door.

The means for securing in rotation comprise for example at least one pin having a portion of smaller diameter and a portion of larger diameter, mounted slidingly through the first and second plates and the bracket, with the first plate having an orifice with a diameter able to receive the portion of larger diameter and with the second plate having an orifice with a diameter able to receive the portion of smaller diameter and less than that of the portion of larger diameter, and the bracket comprising a slot in the shape of an arc of circle centred on the longitudinal axis, with the width of the slot able to receive the portion of smaller diameter of the pin and being less than the diameter of the portion of larger diameter, the slot comprising an end of larger diameter able to receive the portion of larger diameter, and an elastic means applying a force on the pin in the direction of the second door, in a secured state the pin passes through the two orifices of the first and second plates and the end of greater width of the slot of the bracket.

The control mechanism can advantageously comprise means for detecting a position of the male element outside of the recess of the second door and a position in the recess of the second door.

More preferably, the rotation during the first phase has a direction opposite the rotation in the third phase.

In an embodiment, the means of driving are formed by an electric motor. In another embodiment, the means of driving are formed by a manually actuated lever.

Another subject-matter of the present invention is a device for sealingly connecting two enclosed spaces, comprising on the first space a first flange delimiting a first opening and a first door closing off said first opening, in the second space comprising a second flange delimiting a second opening and a second door closing off said second opening, with the second door being secured to the second flange via a bayonet connection and a control mechanism according to the invention, with the first door comprising an annular part providing the sealed contact with the first flange and with the second door and a casing, with the casing and the annular part delimiting with the second door a sealed space, said control mechanism mounted in the annular part.

The device can further comprise means for applying an axial force on the first door in the direction of the first flange. The device can further comprise means for applying an axial force on the second flange in the direction of the first flange.

In an embodiment, the first door is articulated on a wall of the first space by means of a hinge.

Another subject-matter of the present invention a system for transferring powder comprising a device for connecting according to this invention, wherein the first space is an enclosure comprising an upper wall sealingly through which a hopper supplying a powdery material passes through, a lower wall provided with the first flange and the first door in closed position, with the second space being formed by a container to be filled, provided with the second flange and the second door in closed position, and means for bringing into contact by displacement along the longitudinal axis the first and second flanges and means for axially immobilising the second flange in relation to the first flange, and a movable portion of hopper arranged in the cell and able to connect an end of the hopper opening into the cell and the opening of the container.

The displacement of the movable portion of hopper is advantageously obtained by actuating an electric motor. The displacement of the two doors secured to each other can also be advantageously obtained by the actuating of an electric motor.

Another subject-matter of the present invention is a method for sealingly connecting a first and a second enclosed space by means of a control mechanism according to this invention comprising the steps:
  a) putting into contact the first flange and the second flange
  b) putting into rotation of the male element until it penetrates by translation into the recess of the second door,
  c) putting into rotation of the male element in such a way as to axially lock the first and the second door,
  d) putting into rotation of the male element in such a way as to unlock the second door of the second flange,
  e) withdrawing the unit formed by the first and second doors.

More preferably, the step b) takes place when the step a) is verified, the step c) takes place when the step b) is verified, and the step d) takes place when the step c) is verified.

The direction of rotation of the step b) is advantageously opposite that of the step d).

BRIEF DESCRIPTION OF THE DRAWINGS

This invention shall be better understood using the following description and the annexed drawings wherein:

FIG. 5 is a side view of an alternative of the device of FIG. 1.

DETAILED DESCRIPTION OF PARTICULAR EMBODIMENTS

In the following description, a first enclosed space formed by an enclosure 2 and a second enclosed space formed by a container 4 shall be considered. The enclosure can be formed by a glove box or by a cell.

The terms "glove box", "cells", "enclosure" and "container" used to designate the two enclosed spaces are nor restrictive, as the invention applies to the putting into communication of two spaces in general, regardless of these two spaces. For example, the invention can allow for the connection between two glove boxes, or between two cells.

Figure 6:
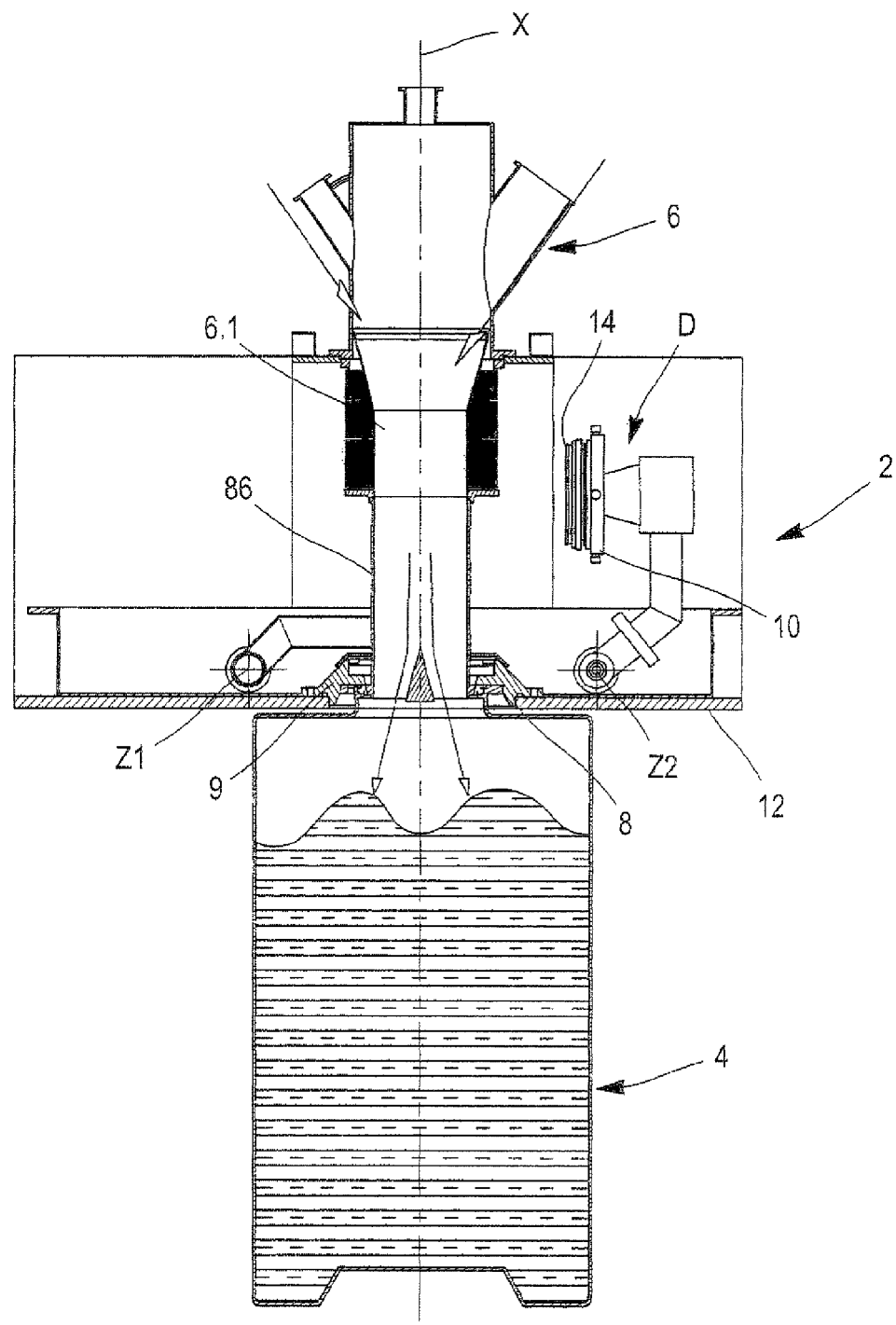
FIG. 6 is a diagrammatical representation of an installation for transferring powder that implements the device for connecting according to the invention.

FIG. 6 shows an installation for transferring powder to which is applied the control mechanism according to the invention.

The installation comprises an enclosure 2 located under a hopper 6 which sealingly passes through an upper wall of the enclosure 2 and an opening 8 in a lower wall 12.

The opening 8 is bordered by a flange 9 and is closed off by a door 10. A control mechanism D according to the invention is provided in the enclosure 2.

A container 4 is located under the enclosure 2 and is provided with a door 14.

Figure 3A:
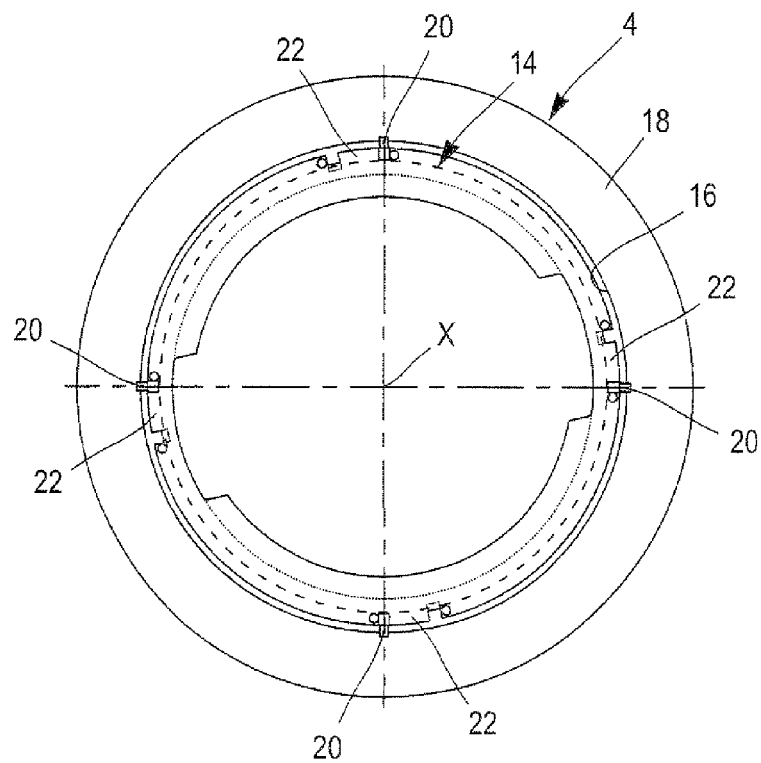
FIGS. 3A to 3F are top views of the container with a portion of the control mechanism according to different steps in the putting into communication of the two enclosed spaces, in an embodiment with two lugs, FIGS. 3A' to 3F' are longitudinal cross-section half-views of the device for connecting according to the different steps of FIGS. 3A to 3F respectively.
Figure 3A:
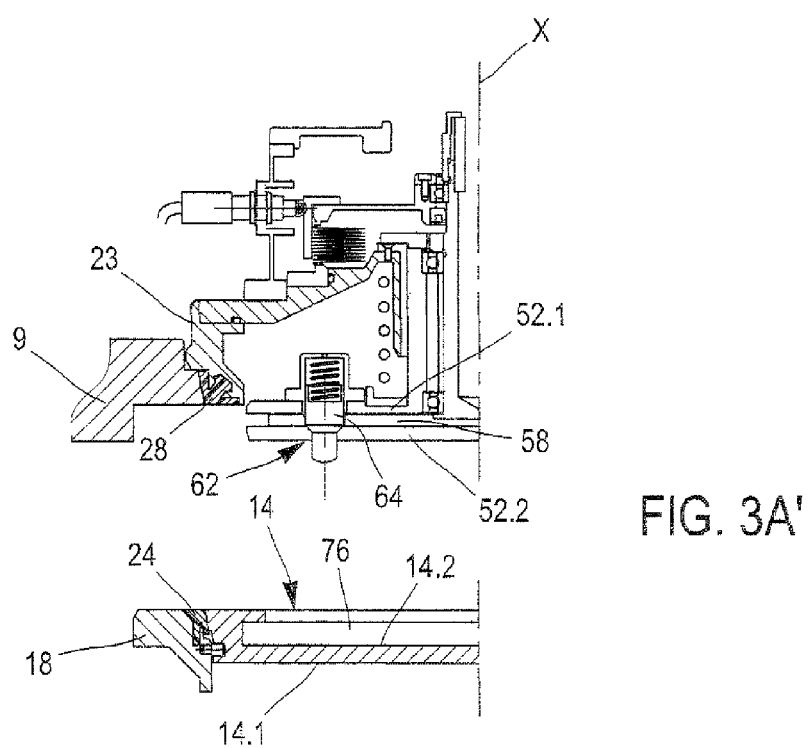

FIG. 3A shows a top view of the container and in particular the door 14. The container comprises an opening 16 delimited by a flange 18 which receives the door 14, with the latter sealingly closing the opening 16.

The device for connecting is formed by the door 10 and the flange 9 of the enclosure and the door 14 and the flange 18 of the container (FIG. 3A').

The door 14 is attached to the flange 18 via a bayonet connection. In the embodiment shown, the flange 18 comprises four fingers 20 extending radially towards the inside of the flange 18 and regularly angularly distributed and the door 14 comprises on its peripheral edge grooves 22 associated to each pin and receiving the latter in a locked state. Alternatively, it can be considered that the fingers 20 be carried by the door 14 and the grooves 22 be made in the flange 18 of container 18. This has for effect to entirely clear the passage, which is particularly advantageous in the case of transferring powder or other elements that can be retained by the protruding fingers.

The door 14 comprises an interior surface 14.1 intended to be located inside the container and an exterior surface 14.2 intended to be located outside of the container (FIG. 3A').

The implementation of fingers 20 has the advantage of offering a very low surface for retaining the powder that comes from the hopper.

A flange of the container provided with lugs penetrating into grooves does not leave the scope of this invention.

A seal 24 is provided between the edge of the flange 18 and the peripheral edge of the door 14 of the container.

Figure 1:
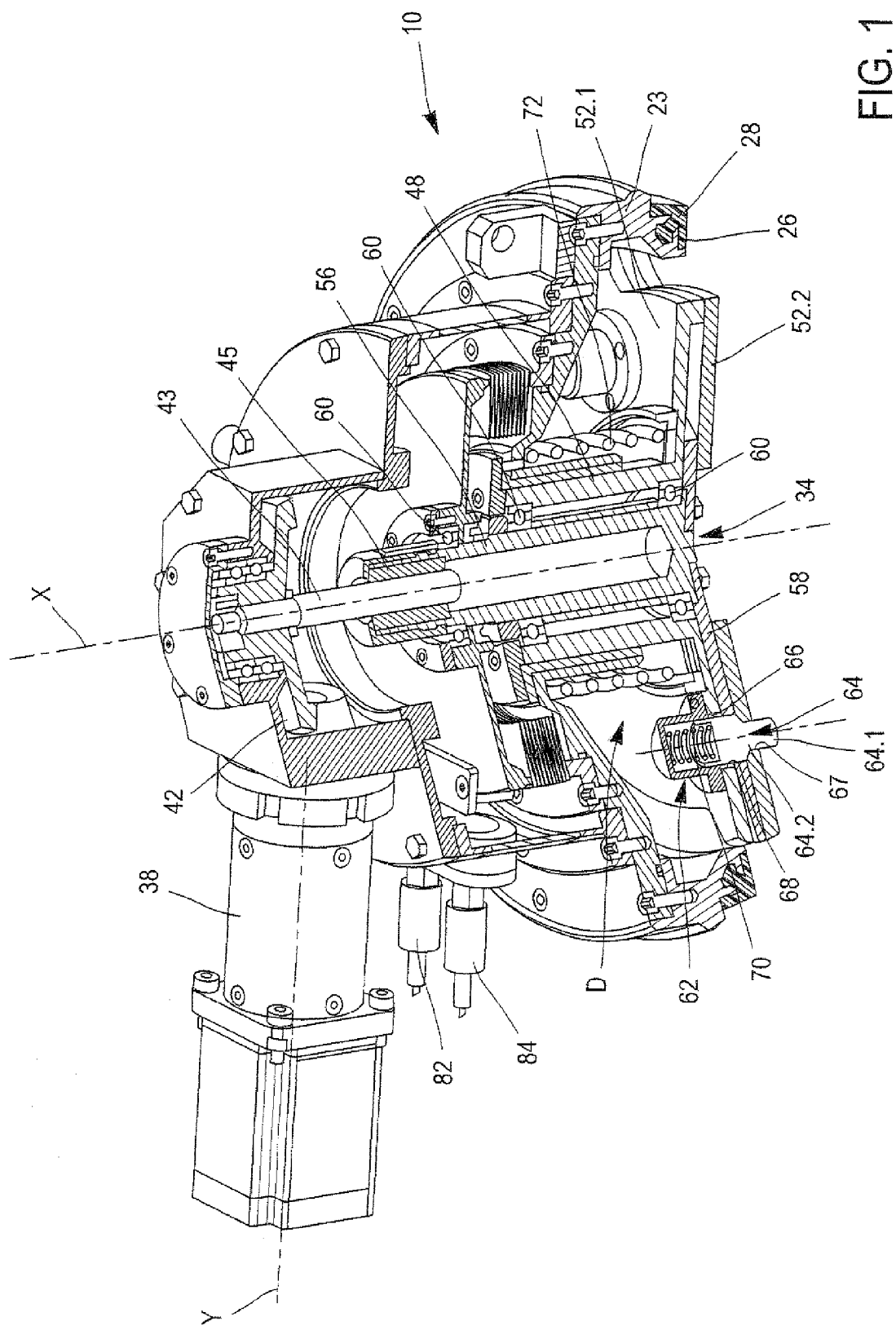
FIG. 1 is a longitudinal cross-section view along two secant planes of an embodiment of a control mechanism according to this invention.
Figure 2:
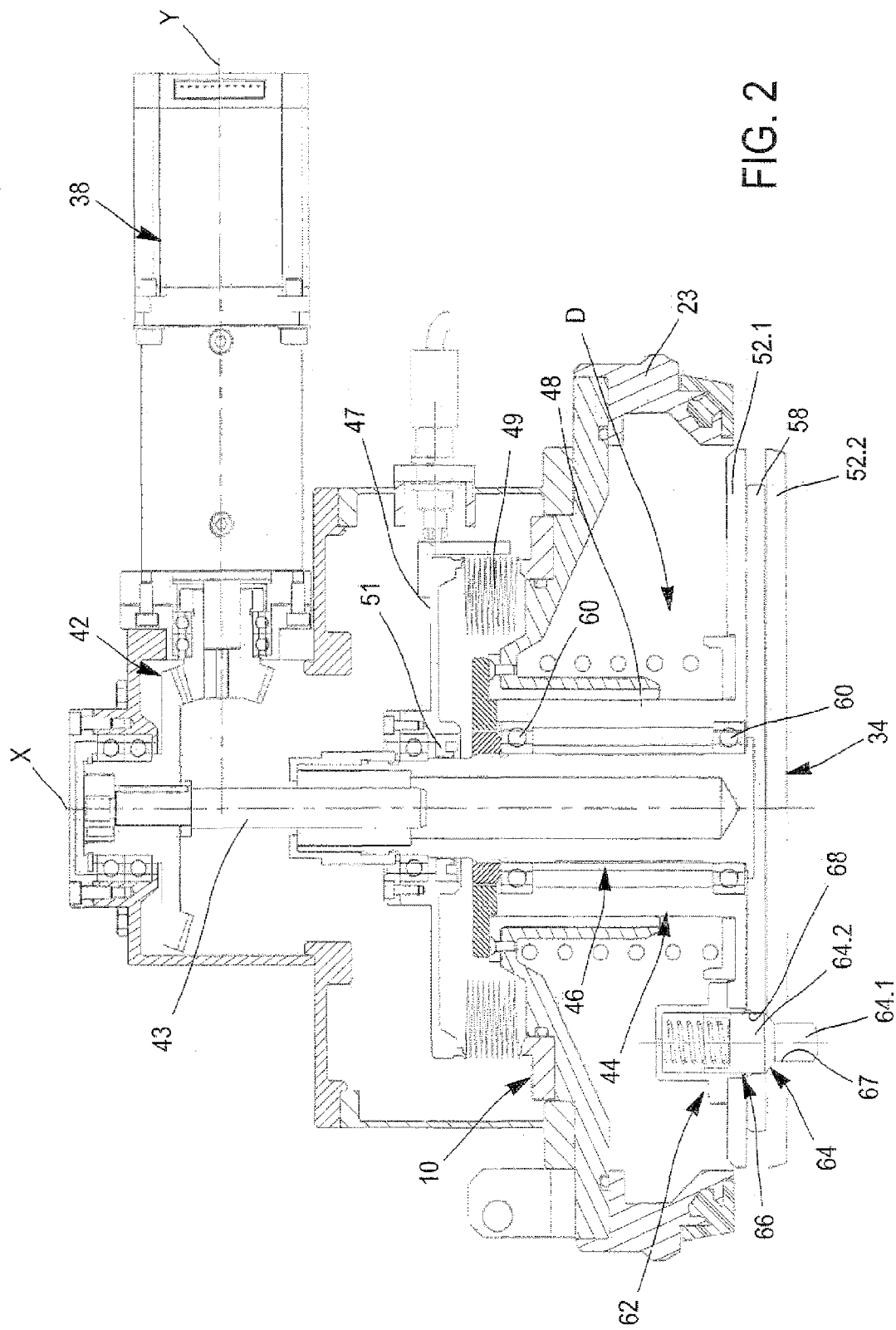
FIG. 2 is a longitudinal cross-section view according to a plane of the control mechanism of FIG. 1A according to another.

In the FIGS. 1 and 2, the control mechanism D shown alone can be seen in detail. The control mechanism D is accommodated in the door 10 of the enclosure. The door 10 is formed by a body that, in the example shown, substantially has the shape of a hat wherein is accommodated the control mechanism D. The casing comprises an annular part 23 provided with an annular face 26 intended to come into contact with the flange 18 and the door 14 of the container. The annular part 23 is, in closed position, accommodated in the flange 9, as is shown in FIG. 3A'. The lateral periphery of the flange 9 and the lateral surface of the annular part 23 are such that the door 10 rests in the flange 9. A seal 28 forms the radially exterior end of the annular face 26 and the lower edge of the lateral periphery of the annular part 23. The seal 28 as such comes into contact with an edge of the exterior surface 14.2 of the door 14 of the container and with the lateral periphery of the flange 9. This seal 28 therefore forms both the seal between the lower wall of the cell and the door 10 and between the two doors 10 and 14.

The means for sealing which shall be described later delimit with the annular part 23 a sealed space in relation to the interior of the enclosure.

Means not shown are provided in order to maintain the door 10 flush against the flange 9 by exerting an axial force on the door in the direction of the flange 9. These forces are cancelled in order to remove the door 10. For example these means can be formed by a cylinder.

The door 10 is more preferably articulated about a horizontal axis by a hinge.

Advantageously an electric motor is provided in order to automate the withdrawal of the doors 10 and 14.

The automated opening is in this example embodiment particularly interesting as the two doors must be raised, which can require a certain physical force. In the case of a vertical device for connection, the weight of the two doors is taken up by the hinge, a manual opening is easier.

The device for connecting comprises a longitudinal axis X about which the doors 10 and 14 are able to pivot. The longitudinal axis X forms the axis of rotation of the control mechanism (FIG. 2).

The control mechanism D provides the handling of the door 14. The device D comprises a male element 34 configured to cooperate with the recess formed in the exterior surface of the door 14, which shall be described later.

The male element 34 is mounted rotatably movable about the longitudinal axis X and in translation along the longitudinal axis X. The male element is rotatably movable and translatably movable in relation to the annular part 23. Means for driving in rotation 38 are provided. In the embodiment shown in FIG. 1, this is an electric motor. In the embodiment shown, the axis Y of the electric motor is perpendicular to the axis of rotation of the male element in order to limit the encumbrance, an angle transmission 42 is provided between the axis of the motor and a shaft 43 engaged with the male element. Very advantageously, the motor is a stepper motor provided with a reference, as such it is possible to know at any time at which stage of the connection the mechanism is in.

The male element 34 comprises an exterior portion 44 configured to drive in rotation the door 14 of the container and shall be designated in what follows as "control portion" and an interior portion 46 configured to axially attach the door 10 to the door 14 and shall be designated in what follows as "axial locking portion".

The control portion 44 comprises a hollow shaft 48 and two plates 52.1, 52.2 perpendicular to the shaft 48 and rigidly fixed to the latter. The plates 52.1, 52.2 provided with lugs extending radially outwards. The lugs 54 are in the number of four, in the embodiment shown, and arranged at right angles to one another. These lugs are configured to penetrate into a recess formed in the exterior surface of the door 14.

The axial locking portion 46 comprises a hollow shaft 56 accommodated inside the hollow shaft 48 of the control portion 44 and engaged with the shaft 43 of the motor. The axial locking portion 46 further comprises a bracket 58 perpendicular to the shaft 56 and mounted between the two plates of the control portion 44. The axial locking portion 46 is mounted able to slide around the shaft 43 along the longitudinal axis. The coupling in rotation between the shaft 43 and the shaft 48 is for example of the type by spline, with the shaft 43 provided with axial splines and the shaft 48 containing on its internal periphery axial ribs cooperating with the grooves.

The hollow shaft 56 is mounted in the hollow shaft 43 by means of ball bearings 60.

The axial locking portion 46 is able to pivot in relation to the control portion 44. A sleeve forming a pad is provided between the shaft 48 of the control portion 44 and the casing in order to reduce friction.

Figure 4A:
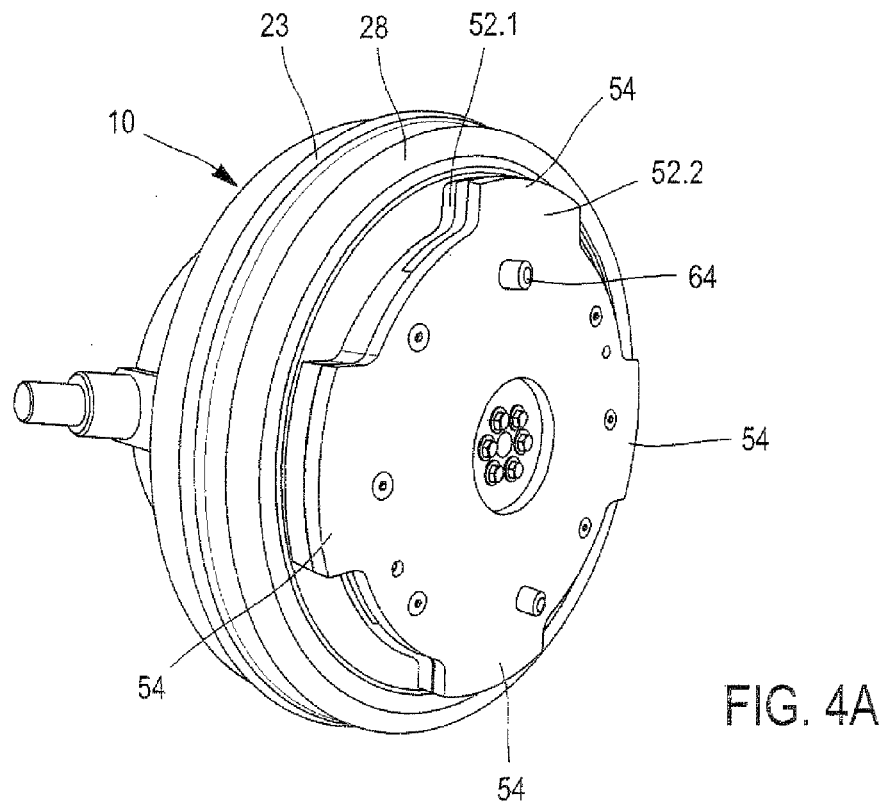
FIGS. 4A and 4B are bottom views of the control mechanism of FIG. 1 and of the door containing the mechanism, in an embodiment with 4 lugs.
Figure 4B:
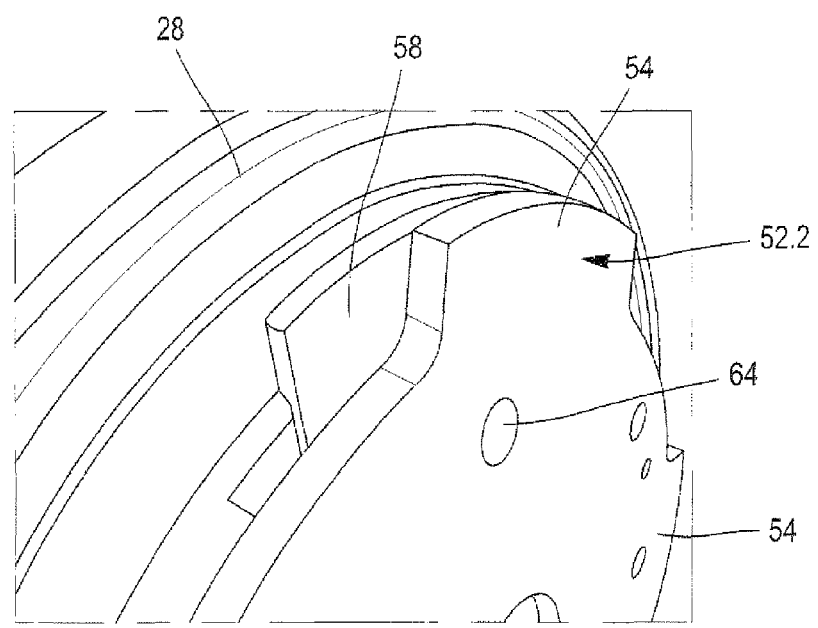

FIGS. 4A and 4B, show an alternative of the control mechanism of FIGS. 1 and 2 seen from below comprising four lugs 54, in this case the bracket can have the shape substantially of a cross.

In FIG. 4A, the bracket does not exit between the plates 52.1, 52.2, and in FIG. 4B, the bracket can be seen pivoted in relation to the plates 52.1, 52.2 and exiting between the plates.

A seal is made around the male portion 34. In the embodiment shown, the latter is formed by a flange 47 passed through by the shaft 56 and a bellows 49 mounted at the radial end of the flange and fixed on the casing and a seal 51 between the orifice of the flange 47 and the shaft 56. The sliding of the male portion 34 is accommodated by the bellows 49.

Figure 3B:
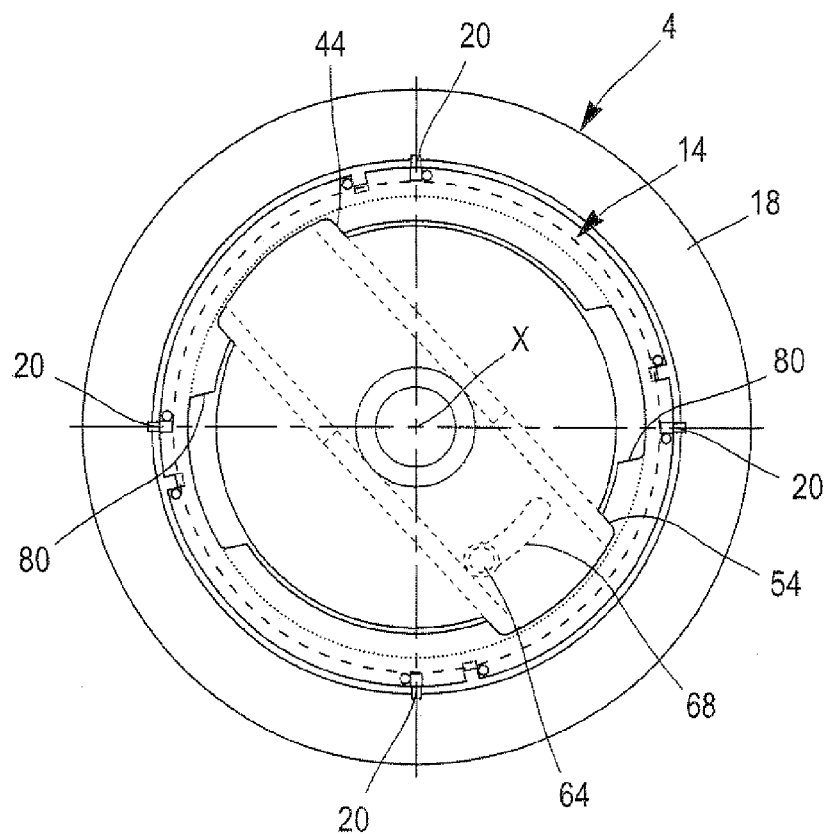
Figure 3B:
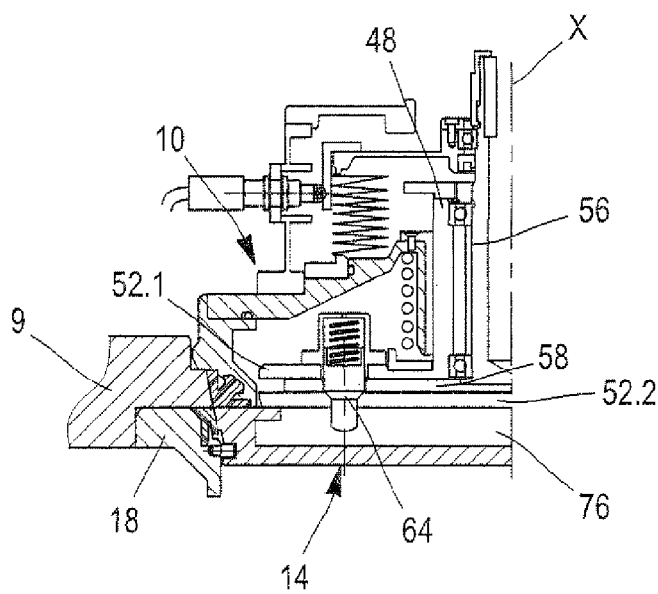
Figure 3C:
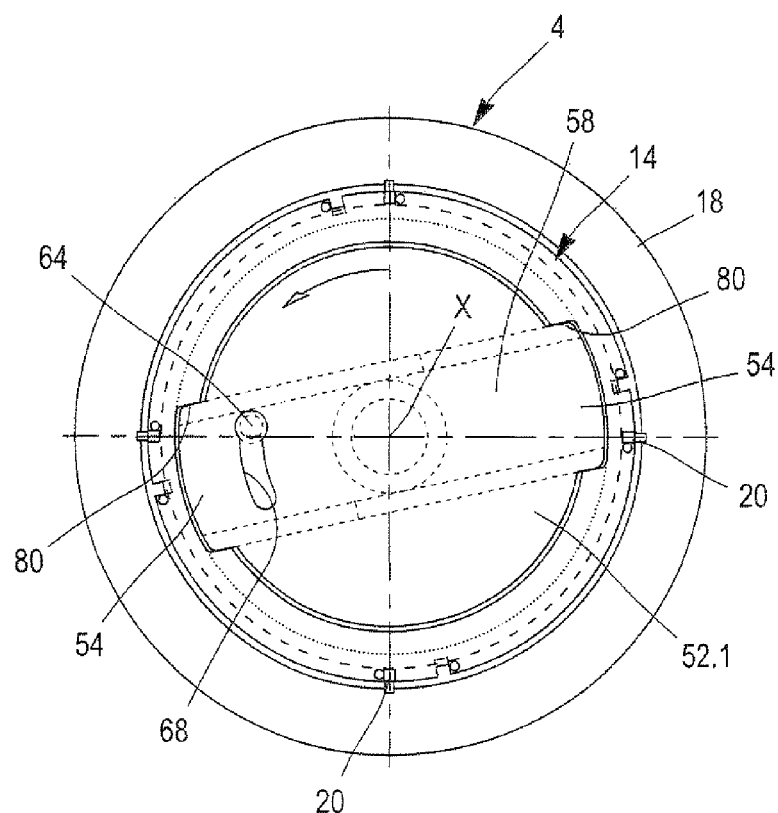
Figure 3C:
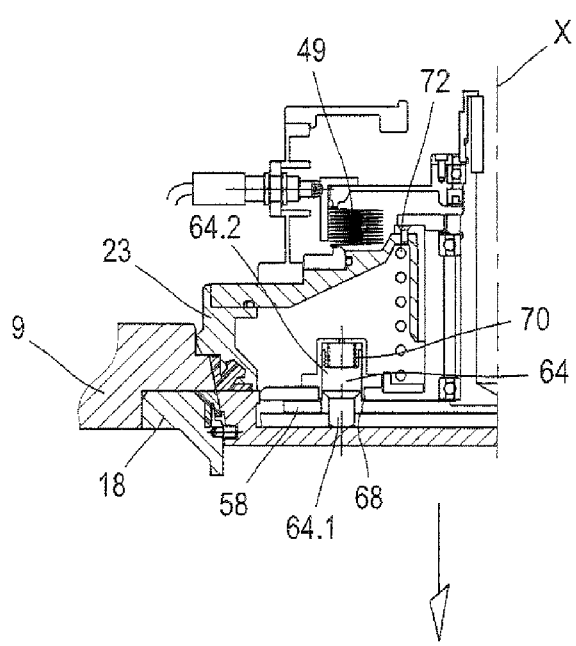
Figure 3D:
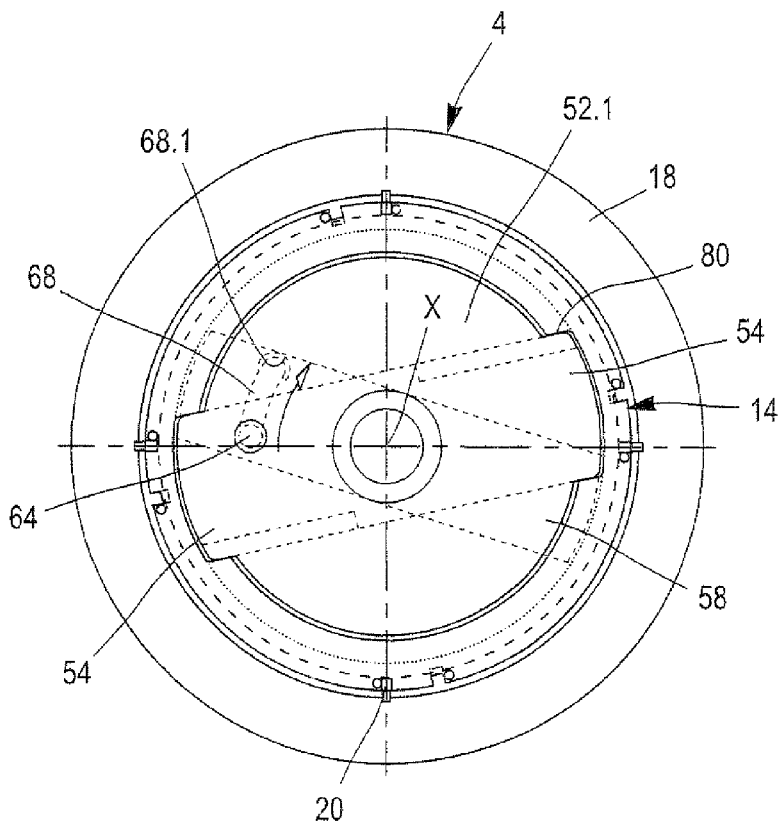
Figure 3D:
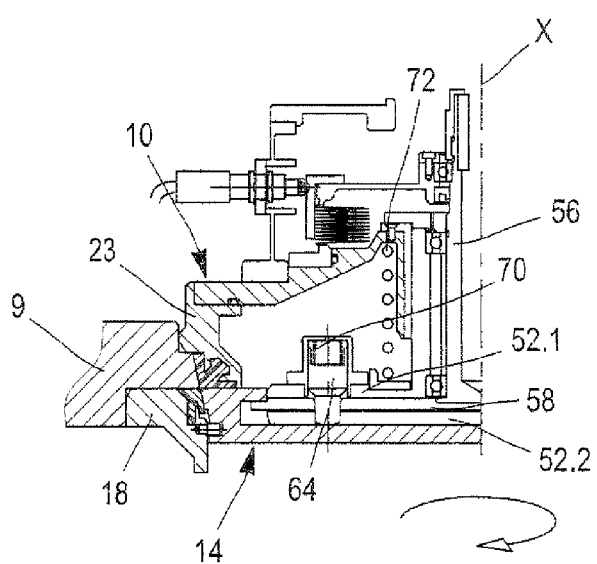
Figure 3E:
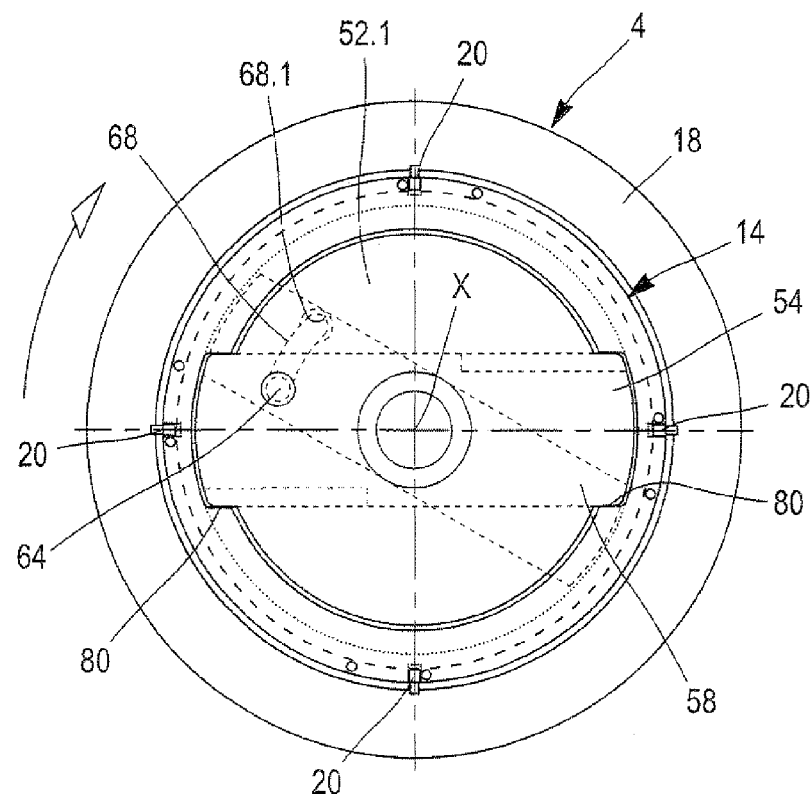
Figure 3E:
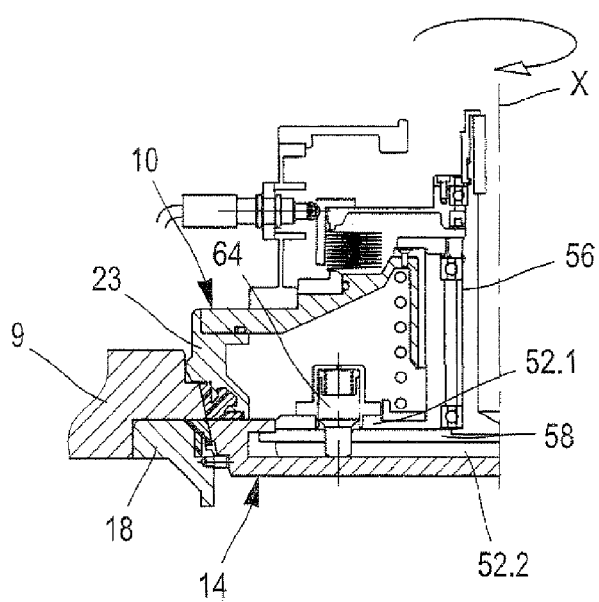
Figure 3F:
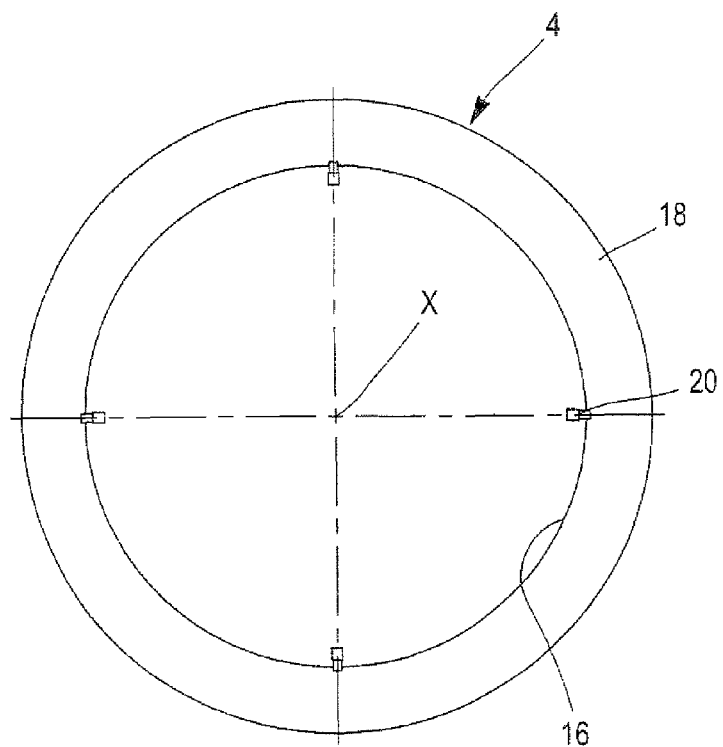
Figure 3F:
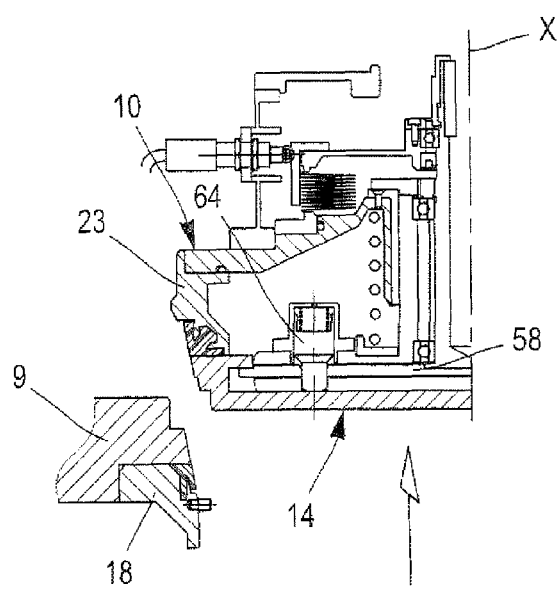

A means of retractably attaching 62 is provided between the control portion 44 and the axial locking portion 46. The latter comprises a pin 64 that has a portion of smaller diameter 64.1 and a portion of larger diameter 64.2, a first perforation 66 in the upper plate 52.1 of a diameter slightly larger than that of the portion of larger diameter 64.2, a second perforation 67 in the lower plate 52.2 of a diameter slightly larger than that of the portion of smaller diameter 64.1, but less than that of the portion of larger diameter 64.2, with the first 66 and second 67 perforations being coaxial, a slot 68 in the shape of an arc of circle centred on the longitudinal axis X formed in the bracket. The slot 68 has a width slightly larger than the diameter of the portion of smaller diameter 64.1 and less than the diameter of the portion of larger diameter 64.2. One 68.1 of the ends of the slot 68 has a diameter slightly larger than that of the portion of larger diameter 64.2, as can be seen in FIGS. 3C and 3E.

Return elastic means 70 are provided on the upper plate 52.1 in order to return the pin 64 towards the exterior of the door 10. The elastic means 70 are formed, in the embodiment shown, by a coil spring mounted in compression between a cage 71 and the pin 64.

In the absence of door 14, the pin 64 is in driven position, its portion of larger diameter 64.2 is accommodated in the end of the slot 66 and the portion of smaller diameter 64.1 penetrates the perforation 67 of the lower plate 52.2. The bracket and the two plates 52.1, 52.2 are secured in rotation, more generally the axial locking portion 46 drives the control portion 44 in rotation.

When a container is arranged under the door 10, the pin 64 is pushed upwards against first elastic means 70, it is then the portion of smaller diameter 64.1 that passes through the slot 68, the pin 64 can then slide in the portion of the slot of which the width is slightly larger than the diameter of the portion of smaller diameter 64.1. The bracket 58 can then pivot in relation to the two plates 52.1, 52.2.

Second return elastic means 72 are mounted in reaction between the upper plate 52.1 and a fixed portion 74 of the door 10.

The female element is carried by the exterior surface of the door 10. The exterior surface comprises a recess 76 of a generally circular shape provided with four cut-outs 78 in its lateral periphery with a shape corresponding to the four lugs of the plates 52.1, 52.2 in such a way as to form for them an accommodation. A peripheral groove 80 is provided in the lateral edge of the recess 76 in order to receive the bracket 58. The depth of the recess 76 is substantially equal to the thickness of the two plates 52.1, 52.2 and the bracket.

Advantageously means of axial immobilisation between the container and the enclosure are provided (not shown). They are more preferably formed by means that rigidly connect the flange 9 of the enclosure and the flange 18 of the container. These means of axial immobilisation can be formed by a ring mounted on the flange of the enclosure and comprising two helical grooves and by a portion rotatably movable about the container 4, with this movable portion comprising two diametrically opposed lugs configured to penetrate and to slide in the helical grooves. The rotation of the movable portion causes the thrusting of the flange of the container against the flange of the enclosure. Alternatively, the container can be arranged on a lifting plate, when the plate rises, it causes the thrusting of the flange of the container against the flange of the enclosure. In the case of a horizontal connection, the container is arranged on a carriage that is displaced horizontally in relation to the cell, with the carriage providing the thrusting.

Advantageously, detecting means are provided in order to detect the presence of the container. For example, a sensor 82 detects the upper position of the male element 34, which indicates that a container is docked. A sensor 84 is advantageously provided to detect the lower position of the male element 34. This detection indicates that the male portion 34 is in position in the recess 76 of the door and that the step of axial locking can begin. The sensors 82 and 84 can be formed simply by a movable part closing or opening an electrical contact.

The operation of this control mechanism shall now be explained using the drawings in FIGS. 3A to 3F and 3A' to 3F'.

Initially the door 14 is locked on the flange 18 of the container and the door 10 is locked on the flange 9 of the enclosure.

During a first step, the flange 18 of the container is arranged below and facing the flange 9 of the enclosure (FIG. 3A'). The setting into place of the container does not require any angular orientation of the latter in relation to the door 10 and to the flange 9 of the enclosure.

Then the two flanges 10, 18 are brought closer together until they are placed into contact. For example by raising the container or by lowering the cell (FIGS. 3B and 3B'). In this position, if the lugs of the plates 52.1, 52.2 are aligned with the cut-outs 80 of the door 14, the plates 52.1, 52.2 are directly accommodated in the recess 76. If the lugs are angularly offset in relation to the cut-outs 80 of the recess, they come to press against the upper edge of the door 14, compressing the two elastic means. The male portion 34 slides upwards around the shaft 43. In this position the pins 66 are in driven position the control portion 44 and the axial locking portion 46 are secured in rotation.

The sensor 82 detects the high position of the male element 34. The motor can then be actuated, which causes via the angle transmission the rotation of the shaft 43 in the clockwise direction, which drives the shaft 56 of the axial locking portion 46, which, itself drives the control portion 44 via the pins 66. The plates 52.1, 52.2 and therefore the lugs rotate about the longitudinal axis X. During the rotation, the lugs are aligned with the cut-outs 80, the lugs under the action of the second elastic means are pushed towards the bottom of the recess 76 and come to press against the latter. (FIG. 3C and FIG. 3C').

Simultaneously the pins 66 are pushed upwards detaching the control portion 44 and the axial locking portion 46.

The sensor 84 detects the lower position of the male element 34. The following step can begin. The motor is again actuated, causing the rotation of the shaft 56 and the bracket solely in the clockwise direction, since the pins 66 in upper position are no longer providing the locking in rotation, the pin 64 slides in the slot in the shape of an arc of circle. The radially exterior ends of the bracket is then accommodated in the groove bordering the recess, and provides an axial locking of the door 10 on the door 14. In the embodiment shown, the bracket pivots in the clockwise direction, for example by an angle of 25°. The length of the slot is chosen in such a way that at the end of the course of rotation, the pin 64 is abutted against the other end of the slot (FIGS. 3D and 3D'). During this step the control portion 44 remains immobile.

During a following step, the motor is again activated, which drives the shaft 56 and the bracket in rotation in the clockwise direction. With the pin 64 abutted against the end of the slot, the bracket 58 drives the pin 64 in rotation, which puts into rotation the plates 52.1, 52.2. However with the latter being accommodated substantially without clearance in the recess of the door 10, more particularly the lugs, the rotation of the plates 52.1, 52.2 causes the rotation of the door 14 in the clockwise direction in relation to the flange 9 of the container and its unlocking. A detection of the unlocking can be advantageously provided, for example by measuring the current of the motor.

The angle of rotation is by way of example of a magnitude of 12.5° (FIGS. 3E and 3E').

The door 14 can then be removed in order to release the opening of the container. For this, the door 10 of the enclosure is separated from its flange 9 carrying the door 10 with it.

In the embodiment shown, the removal of the door 10 is accomplished by a translation upwards then a rotation (3F and 3F').

The sealed transfer between the interior of the enclosure and the interior of the container can take place, the exterior surfaces of the doors are sealingly isolated in relation to the inside of the container and of the enclosure. For example, as is shown in FIG. 6, the container can be loaded with a powdery material conveyed by the fixed hopper 6 opening into the upper wall of the enclosure 2 and by a movable portion of hopper 86 which is set in place after opening of the doors 10, 14. The movable portion of hopper is articulated about an axis Z1. The control mechanism D is articulated about an axis Z2 parallel to the axis Z1 and orthogonal to the axis X. This movable portion of hopper 86 advantageously conveys the powdery material to the inside of the container, limiting the dispersion of the material in the enclosure. In the embodiment shown, the hopper 6 comprises a sliding portion 6.1 that accosts the movable portion of hopper when it is in place above the container 4.

The putting back into place of the doors is carried out inversely, the latter is explained briefly hereinbelow.

The doors 10 and 14 are put back into place in their respective flange.

The motor is activated in such a way as to cause the rotation of the shaft 43 in the anti-clockwise direction. The pivoting of the bracket 58 alone releases it and aligns it with the cut-outs of the recess. The door 14 is not yet locked on the flange 18.

The motor is then again actuated and causes the rotation in the anti-clockwise direction of the bracket 58 which drives the plates 52.1, 52.2 via the pin 64 which is in abutment. The door 14 is then again locked on the flange 18 of the container.

The container can then be disengaged. A detection of the closing of the door 10 can be provided, before the disengaging of the container.

In the example shown, the setting into place of the lugs of the plates in the recess of the door of the container and the unlocking of the door 14 are carried out in the same direction of rotation. Advantageously, it is provided to carry out these two steps in opposite directions which makes it possible to prevent any risk of untimely unlocking the cover of the container during the setting into place of the lugs.

In the embodiment shown, the door 10 of the enclosure is located in a lower wall of the enclosure, but it could be located on an upper wall or on a lateral wall.

The values of the angle of rotation are provided solely by way of example. The latter are determined according to the size of the door of the container and the number of lugs. More preferably the latter are chosen as low as possible in order to reduce friction and limit the risks of particle generation.

Furthermore means for detecting the various manoeuvres can be provided in order to further increase the safety and, in particular, in the case where the doors are not visible.

The motor is in the embodiment shown arranged in the enclosure, but it can be provided to displace it outside of the enclosure for example by means of adapted angle transmissions.

The control mechanism according to the invention makes it possible to not require an orientation of the container, which is particularly interesting in the case of a container of substantial size. Furthermore, it facilitates the setting into place of an automated sealed connection, with the absence of orientation of the container simplifying the installation.

The activation of the motor can be accomplished by a control by means of one or several buttons, for example one button for each step. However then, the motor can be activated sequentially by means of a programmable automaton programmed for this purpose.

In the embodiment shown a single motor is used to place into rotation the control portion and the axial locking portion, which makes it possible to reduce the encumbrance. However a motor or a means for driving in rotation dedicated to each of the portions could be considered, in this embodiment, the means for immobilising formed by the pin between the two portions would no longer be required.

In FIG. 5, an embodiment is shown wherein the actuating of the device is carried out manually. For example, a lever 38' is mounted in place of the electric motor rotatably movable about an axis Y perpendicular to the longitudinal axis X. The structure of the control mechanism is otherwise similar to that described hereinabove in relation with FIGS. 1 to 3F'. A lever rotatably movable directly about the axis X avoiding an angle transmission could be considered. This device can for example be set in place in a glove box, wherein the operator can access the lever easily. For example a manual control is particularly interesting in the case where electrical devices are not desired, for example for risks of ignition. More preferably, the door 10 is mounted articulated in rotation on the enclosure. Means for maintaining in flush position of the flange against the door are provided. A manual control is particularly adapted during a vertical mounting.

In this embodiment with manual control, means for detecting the presence of the door of the container and its locked or unlocked state and mechanical safety are provided in order to avoid any possibility of the lever pivoting in case of absence of the container. These means can be formed by pins which in the absence of the door 14 are protruding and lock the lever and in the presence of the door are driven in and the lever is unlocked. These means are well known to those skilled in the art and will not be described in detail.

What is claimed is:

1. Mechanism for controlling a device for sealingly connecting a first and a second enclosed space, with the first space comprising a first flange delimiting a first opening and a first door closing off said first opening, with the second space comprising a second flange delimiting a second opening and a second door closing off said second opening, the second door being secured to the second flange via a bayonet connection, with the first door comprising an annular part providing the sealed contact with the first flange and with the second door and a casing, with the casing and the annular part delimiting with the second door a sealed space, said control mechanism mounted in the annular part, said control mechanism comprising:
 a male element configured to cooperate with a female element carried by the second door via a bayonet connection,
 means for driving in rotation said male element, said male element being translatably movable along the longitudinal axis and rotatably movable about the longitudinal axis in relation to the annular part, in such a way as to allow for the connection between the two spaces according to at least the following phases:
 a first phase of rotation for searching for the docking position of the male element on the female element, during which the male element is rotated with respect to the annular part,
 a second phase of translation during which the male element docks with the female element and during which the male element is translated with respect to the annular part,
 a third phase of rotation in order to provide the axial locking of the two doors,
 a fourth phase of rotation in order to provide the unlocking of the second door in relation to the second flange.

2. Control mechanism according to claim 1, wherein the male element comprises an axial locking portion and a control portion, with said portions being rotatably movable in relation to one another about the longitudinal axis, with the axial locking portion configured for the axial locking of the first door and of the second door and the control portion configured for the locking or unlocking of the second cover.

3. Control mechanism according to claim 2, wherein the axial locking portion comprises a bracket perpendicular to the longitudinal axis and connected to the means for driving in rotation about the longitudinal axis, said bracket configured to cooperate with the recess of the second door in order to provide the axial locking of the first and second doors, and wherein the control portion comprises a substantially circular first plate and second plate provided with lugs, said plates being parallel and spaced apart from one another along the longitudinal axis by a fixed distance in such a way as to arrange a space wherein is arranged able to pivot the bracket, said lugs being configured to cooperate with cut-outs of the recess (76) in such a way that a rotation of the control portion drives in rotation the second door, with the first plate and the second plate being connected to the means for driving in rotation.

4. Control mechanism according to claim 3, wherein the means for driving in rotation are engaged with a drive shaft attached to the bracket, said first and second plates being fixed on a hollow shaft through which passes the drive shaft of the locking portion, and wherein the control mechanism comprises retractable means for securing in rotation connecting the bracket and the first and second plates in such a way that, during the first phase, the first and second plates and the bracket are secured in rotation, during the third phase, the bracket pivots and the first and second plates are immobile and, during the fourth phase, the first and second plates and the bracket are secured in rotation.

5. Control mechanism according to claim 4, wherein the drive shaft attached to the bracket is translatably movable along the longitudinal axis and wherein second elastic means are mounted in compression between the first plate and a fixed portion of the control mechanism in such a way as to push the first plate and the bracket in the direction of the second door.

6. Control mechanism according to claim 4, wherein the means for securing in rotation comprise at least one pin having a portion of smaller diameter and a portion of larger diameter, mounted slidingly through the first and second plates and the bracket, with the first plate having an orifice with a diameter able to receive the portion of larger diameter and the second plate having an orifice with a diameter able to receive the portion of smaller and less than that of the portion of larger diameter, and the bracket comprising a slot in the shape of an arc of circle centred on the longitudinal axis, with the width of the slot able to receive the portion of smaller diameter of the pin and being less than the diameter of the portion of larger diameter, with the slot comprising an end of greater width able to receive the portion of larger diameter, and an elastic means applying a force on the pin in the direction of the second door, in an attached state the pin passes through the two orifices of the first and second plates and the end of greater width of the slot the bracket.

7. Control mechanism according to claim 2, comprising means for detecting a position of the male element outside of the recess of the second door and a position in the recess of the second door.

8. Control mechanism according to claim 1, wherein the rotation during the first has a direction opposite the rotation in the third phase.

9. Control mechanism according to claim 1, wherein the means of driving are formed by an electric motor.

10. Control mechanism according to claim 1, wherein the means for driving are formed by a manually actuated lever (38').

11. Device for sealingly connecting two enclosed areas, comprising on the first space a first flange delimiting a first opening and a first door closing off said first opening, on the second space comprising a second flange delimiting a second opening and a second door closing off said second opening, the second door being secured to the second flange via a bayonet connection with the first door comprising an annular part providing the sealed contact with the first flange and with the second door and a casing, with the casing and the annular part delimiting with the second door a sealed space, said control mechanism mounted in the annular part, and a control mechanism comprising said control mechanism comprising,
- a male element configured to cooperate with a female element carried by the second door via a bayonet connection,
- means for driving in rotation said male element, said male element being translatably movable along the longitudinal axis and rotatably movable about the longitudinal axis in relation to the annular part, in such a way as to allow for the connection between the two spaces according to at least the following phases:
- a first phase of rotation for searching for the docking position of the male element on the female element, during which the male element is rotated with respect to the annular part,
- a second phase of translation during which the male element docks with the female element and during which the male element is translated with respect to the annular part,
- a third phase of rotation in order to provide the axial locking of the two doors,
- a fourth phase of rotation in order to provide the unlocking of the second door in relation to the second flange.

12. Device for connecting according to claim 11, comprising means for applying an axial force on the first door in the direction of the first flange.

13. Device for connecting according to claim 11, wherein the first door is articulated on a wall of the first space by means of a hinge.

14. System for transferring powder comprising a device for connecting according to claim 11, wherein the first space is an enclosure comprising an upper wall sealingly passed through by a hopper for supplying a powder material, a lower wall provided with the first flange and the first door in closed position, with the second space formed by a container to be filled, provided with the second flange and the second door in closed position, and means for bringing into contact by displacement along the longitudinal axis the first and second flanges and means for axially immobilising the second flange in relation to the first flange, and a movable portion of hopper arranged in the cell and able to connect an end of the hopper opening into the cell and the opening of the container.

15. System for transferring powder according to claim 14, wherein the displacement of the movable portion of hopper is obtained by the actuating of an electric motor.

16. System for transferring powder according to claim 14, wherein the displacement of the two doors secured to each other is obtained by the actuating of an electric motor.

17. Method for sealingly connecting a first and a second enclosed space by means of a control mechanism, with the first space comprising a first flange delimiting a first opening and a first door closing off said first opening, with the second space comprising a second flange delimiting a second opening and a second door closing off said second opening, the second door being secured to the second flange via a bayonet connection, with the first door comprising an annular part providing the sealed contact with the first flange and with the second door and a casing, with the casing and the annular part delimiting with the second door a sealed space, said control mechanism mounted in the annular part, said control mechanism comprising:
- a male element configured to cooperate with a female element carried by the second door via a bayonet connection,
- means for driving in rotation said male element, said male element being translatably movable along the longitudinal axis and rotatably movable about the longitudinal axis in relation to the annular part, in such a way as to allow for the connection between the two spaces according to at least the following phases:
- a first phase of rotation for searching for the docking position of the male element on the female element, during which the male element is rotated with respect to the annular part,
- a second phase of translation during which the male element docks with the female element and during which the male element is translated with respect to the annular part,
- a third phase of rotation in order to provide the axial locking of the two doors,
- a fourth phase of rotation in order to provide the unlocking of the second door in relation to the second flange,
Said method comprising the steps:
a) putting into contact the first flange and the second flange
b) putting into rotation of the male element until it penetrates by translation into the recess of the second door,
c) putting into rotation of the male element in such a way as to axially lock the first and the second door,
d) putting into rotation of the male element in such a way as to unlock the second door of the second flange,
e) withdrawing the unit formed by the first and second doors.

18. Method for connecting according to claim 17, wherein the step b) takes place when the step a) is verified, the step c) takes place when the step b) is verified, and the step d) takes place when the step c) is verified.

19. Method for connecting according to claim 17, wherein the direction of rotation of the step b) is opposite that of the step d).

* * * * *

UNITED STATES PATENT AND TRADEMARK OFFICE
CERTIFICATE OF CORRECTION

| | | |
|---|---|---|
| PATENT NO. | : 9,540,857 B2 | Page 1 of 1 |
| APPLICATION NO. | : 14/347702 | |
| DATED | : January 10, 2017 | |
| INVENTOR(S) | : Jean-Pierre Simon et al. | |

It is certified that error appears in the above-identified patent and that said Letters Patent is hereby corrected as shown below:

In the Specification

Column 5, Line 49: replace "container and" with -- container 4 and --.

Column 7, Line 33: replace "A sleeve forming" with -- A sleeve 45 forming --.

Column 8, Line 56: replace "door and" with -- door 14 and --.

Signed and Sealed this
Thirtieth Day of May, 2017

Michelle K. Lee
*Director of the United States Patent and Trademark Office*